(12) United States Patent
Takemura

(10) Patent No.: US 11,493,868 B2
(45) Date of Patent: Nov. 8, 2022

(54) IMAGE FORMING APPARATUS WHICH CONTROLS DENSITY OF IMAGE IN MAIN SCANNING DIRECTION

(71) Applicant: CANON KABUSHIKI KAISHA, Tokyo (JP)

(72) Inventor: Taichi Takemura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/480,569

(22) Filed: Sep. 21, 2021

(65) Prior Publication Data
US 2022/0091551 A1    Mar. 24, 2022

(30) Foreign Application Priority Data
Sep. 23, 2020 (JP) .............................. JP2020-158690

(51) Int. Cl.
| | | |
|---|---|---|
| *G03G 15/00* | (2006.01) | |
| *G06K 15/02* | (2006.01) | |
| *G03G 15/01* | (2006.01) | |
| *G06K 15/00* | (2006.01) | |

(52) U.S. Cl.
CPC ..... *G03G 15/5041* (2013.01); *G03G 15/0105* (2013.01); *G06K 15/027* (2013.01); *G06K 15/408* (2013.01)

(58) Field of Classification Search
CPC ........... G03G 15/5041; G03G 15/5062; G06K 15/027

USPC .................................................... 399/15, 72
See application file for complete search history.

(56) References Cited

U.S. PATENT DOCUMENTS

| | | | |
|---|---|---|---|
| 7,609,909 B2 | 10/2009 | Sasanuma et al. | |
| 10,935,915 B2 * | 3/2021 | Nakazato | ........... G03G 15/5062 |
| 2021/0356894 A1 * | 11/2021 | Nishikata et al. . | G03G 15/5062 |

FOREIGN PATENT DOCUMENTS

| | | |
|---|---|---|
| JP | 2004-163216 A | 6/2004 |
| JP | 2007-264364 A | 10/2007 |

* cited by examiner

*Primary Examiner* — William J Royer
(74) *Attorney, Agent, or Firm* — Venable LLP

(57) ABSTRACT

An image forming apparatus includes an image forming unit having a photosensitive member, an exposure unit, and a developing unit having a developing sleeve; and a controller configured to acquire read data relating to a first test image, a second test image, and a third test image formed on a same sheet by the image forming unit, and adjust a density in a main scanning direction of an image to be formed by the image forming unit based on the read data. A first interval between the first test image and the second test image is different from a second interval between the second test image and the third test image. Each of the first interval and the second interval is different from an integral multiple of a circumferential length of the photosensitive member, and is different from an integral multiple of a circumferential length of the developing sleeve.

13 Claims, 12 Drawing Sheets

|  | REGION A | REGION B | REGION C | REGION D | REGION E |
|---|---|---|---|---|---|
| FIRST BAND | 0.83 | 0.79 | 0.76 | 0.76 | 0.72 |
| SECOND BAND | 0.78 | 0.76 | 0.76 | 0.75 | 0.75 |
| THIRD BAND | 0.77 | 0.75 | 0.72 | 0.73 | 0.74 |

|  | REGION A | REGION B | REGION C | REGION D | REGION E |
|---|---|---|---|---|---|
| FIRST BAND | 0.058 | 0.018 | -0.012 | -0.012 | -0.052 |
| SECOND BAND | 0.02 | 0 | 0 | -0.01 | -0.01 |
| THIRD BAND | 0.028 | 0.008 | -0.022 | -0.012 | -0.002 |

|  | REGION A | REGION B | REGION C | REGION D | REGION E |
|---|---|---|---|---|---|
| FIRST BAND | -12 | -4 | 2 | 2 | 10 |
| SECOND BAND | -4 | 0 | 0 | 2 | 2 |
| THIRD BAND | -6 | -2 | 4 | 2 | 0 |

|  | REGION A | REGION B | REGION C | REGION D | REGION E |
|---|---|---|---|---|---|
| CORRECTION LEVEL | -7 | -2 | 2 | 2 | 4 |

FIG. 14

|  | REGION A | REGION B | REGION C | REGION D | REGION E |
|---|---|---|---|---|---|
| FIRST BAND | 0.795 | 0.78 | 0.77 | 0.77 | 0.74 |
| SECOND BAND | 0.745 | 0.75 | 0.77 | 0.76 | 0.77 |
| THIRD BAND | 0.735 | 0.74 | 0.73 | 0.74 | 0.76 |

FIG. 15

|  | REGION A | REGION B | REGION C | REGION D | REGION E |
|---|---|---|---|---|---|
| FIRST BAND | 0.77 | 0.77 | 0.77 | 0.77 | 0.77 |
| SECOND BAND | 0.72 | 0.74 | 0.77 | 0.76 | 0.8 |
| THIRD BAND | 0.71 | 0.73 | 0.73 | 0.74 | 0.79 |

FIG. 16

|  | REGION A | REGION B | REGION C | REGION D | REGION E |
|---|---|---|---|---|---|
| FIRST BAND | 0.82 | 0.8 | 0.77 | 0.78 | 0.74 |
| SECOND BAND | 0.77 | 0.77 | 0.77 | 0.77 | 0.77 |
| THIRD BAND | 0.76 | 0.76 | 0.73 | 0.75 | 0.76 |

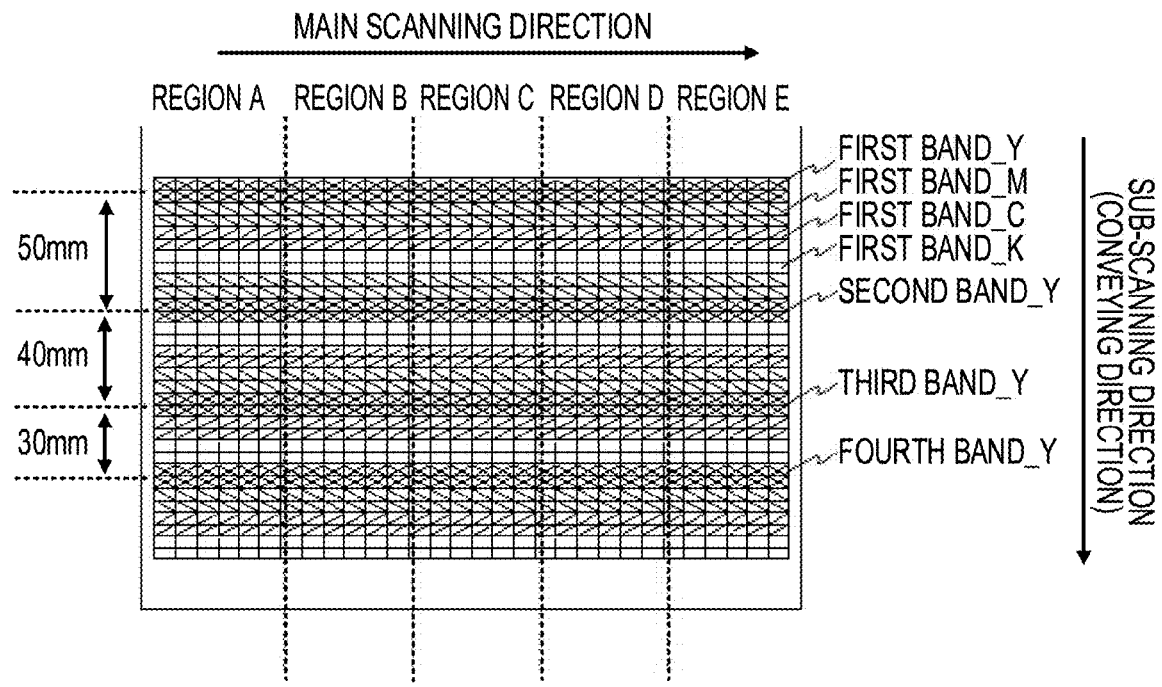

IMAGE FORMING APPARATUS WHICH CONTROLS DENSITY OF IMAGE IN MAIN SCANNING DIRECTION

BACKGROUND OF THE INVENTION

Field of the Invention

The present invention relates to an image forming apparatus which controls a density of an image in a main scanning direction.

Description of the Related Art

In an image forming apparatus using an electrophotographic method, an image is formed by scanning a photosensitive member with a laser beam. In an electrophotographic print engine, a laser scanner first irradiates a photosensitive drum charged by a charger with a laser beam based on an image signal to form an electrostatic latent image on the photosensitive drum. Then, an electrostatic latent image formed on the photosensitive drum is developed with toner to form a toner image on the photosensitive drum, and the toner image is transferred to a sheet and fused and thermally fixed by a fixing device to form an image on the sheet.

In such an image forming apparatus, unevenness in charging due to deterioration of the charger configured to charge the photosensitive drum, unevenness in exposure of the laser scanner configured to write a latent image on the photosensitive drum, and unevenness in development of a developing device configured to develop a latent image formed on the photosensitive drum may occur. The unevenness may cause density unevenness in a main scanning direction (sheet width direction orthogonal to a sheet conveying direction) of the image to be formed.

Japanese Patent Application Laid-Open No. 2004-163216 proposes a technique in which a sheet on which a pattern image extending in the main scanning direction is printed is output as a test print, density at different positions in the pattern image is read by a handy density meter, and density unevenness in the main scanning direction is corrected.

Japanese Patent Application Laid-Open No. 2007-264364 also proposes a technique in which a plurality of pattern images are arranged in a sub-scanning direction and density unevenness in the main scanning direction is corrected by adding the density unevenness in the sub-scanning direction.

In the image forming apparatus using the electrophotographic method, density unevenness caused by a rotary member such as the photosensitive drum may occur. That is, the density unevenness with a period may occur in the sub-scanning direction. This means that, considering an inclination of the density in the main scanning direction (the spatial light and shade of the density in the main scanning direction), a portion in which the density is inclined (a portion with light and shade) and a portion in which the density is not inclined (a portion without light and shade) are periodically generated in the sub-scanning direction.

For example, if the density unevenness is caused by the photosensitive drum having a diameter of 30 mm, the density unevenness as described above occurs at a pitch of about 94 mm (≈30 mm×π) in the sub-scanning direction of the sheet. If the density unevenness is caused by a developing sleeve having a diameter of 25 mm, the density unevenness occurs at a pitch of about 79 mm (≈25 mm×π). If a plurality of causes overlap, density unevenness occurs in a plurality of pitches.

In a case in which the above-mentioned density unevenness is to be corrected by the technique of Japanese Patent Application Laid-Open No. 2004-163216 or Japanese Patent Application Laid-Open No. 2007-264364, the correction accuracy is different between a correction result using a pattern image formed at the portion in which the density is inclined and a correction result using a pattern image formed at the portion in which the density is not inclined.

As disclosed in Japanese Patent Application Laid-Open No. 2007-264364, even in a case in which a plurality of pattern images of the same color are present in the sub-scanning direction, an interval between the pattern images of the same color and a period of density unevenness in the sub-scanning direction may overlap or come close to each other. In this case, even if the plurality of pattern images of the same color are used, all the pattern images are created at the portion in which the density is inclined or the portion in which the density is not inclined. As described above, in the conventional technique, the density unevenness correction in the main scanning direction cannot be performed accurately.

SUMMARY OF THE INVENTION

According to an embodiment of the present invention, an image forming apparatus comprises:
an image forming unit configured to form an image, the image forming unit including:
a photosensitive member that is rotated;
an exposure unit configured to expose the photosensitive member to form an electrostatic latent image on the photosensitive member; and
a developing unit having a developing sleeve carrying toner and rotating, and configured to develop the electrostatic latent image on the photosensitive member with the toner on the developing sleeve; and
a controller configured to:
control the image forming unit to form a first test image, a second test image, and a third test image used for adjusting a density in a main scanning direction of an image having a predetermined color to be formed by the image forming unit at different positions in a direction orthogonal to the main scanning direction on a same sheet;
acquire read data relating to the first test image, the second test image, and the third test image on the same sheet, the read data being output from a reading device; and
adjust the density in the main scanning direction of an image having the predetermined color to be formed by the image forming unit based on the read data,
wherein a first interval between the first test image and the second test image in the direction orthogonal to the main scanning direction is different from a second interval between the second test image and the third test image in the direction orthogonal to the main scanning direction,
wherein each of the first interval and the second interval is different from an integral multiple of a circumferential length of the photosensitive member, and
wherein each of the first interval and the second interval is different from an integral multiple of a circumferential length of the developing sleeve.

Further features of the present invention will become apparent from the following description of exemplary embodiments with reference to the attached drawings.

BRIEF DESCRIPTION OF THE DRAWINGS

FIG. 14 is a view showing the density measurement result after the density unevenness correction in the first embodiment.

FIG. 15 is a view showing the density measurement results after the conventional density unevenness correction.

FIG. 16 is a view showing the density measurement results after the conventional density unevenness correction.

FIG. 17 is a view showing an example of a test pattern for a density unevenness correction in a second embodiment.

FIG. 18 is a view showing an example of the band intervals for respective colors of the test pattern for the density unevenness correction in the second embodiment.

DESCRIPTION OF THE EMBODIMENTS

First Embodiment

In the present embodiment, a method for solving the above issues will be described using a laser beam printer of the electrophotographic method. However, as long as the electrophotographic method is used, a printer other than the laser beam printer may be used. For example, the printer may be an LED printer.

<Image Forming Apparatus>
[Hardware Configuration]

Figure 1:
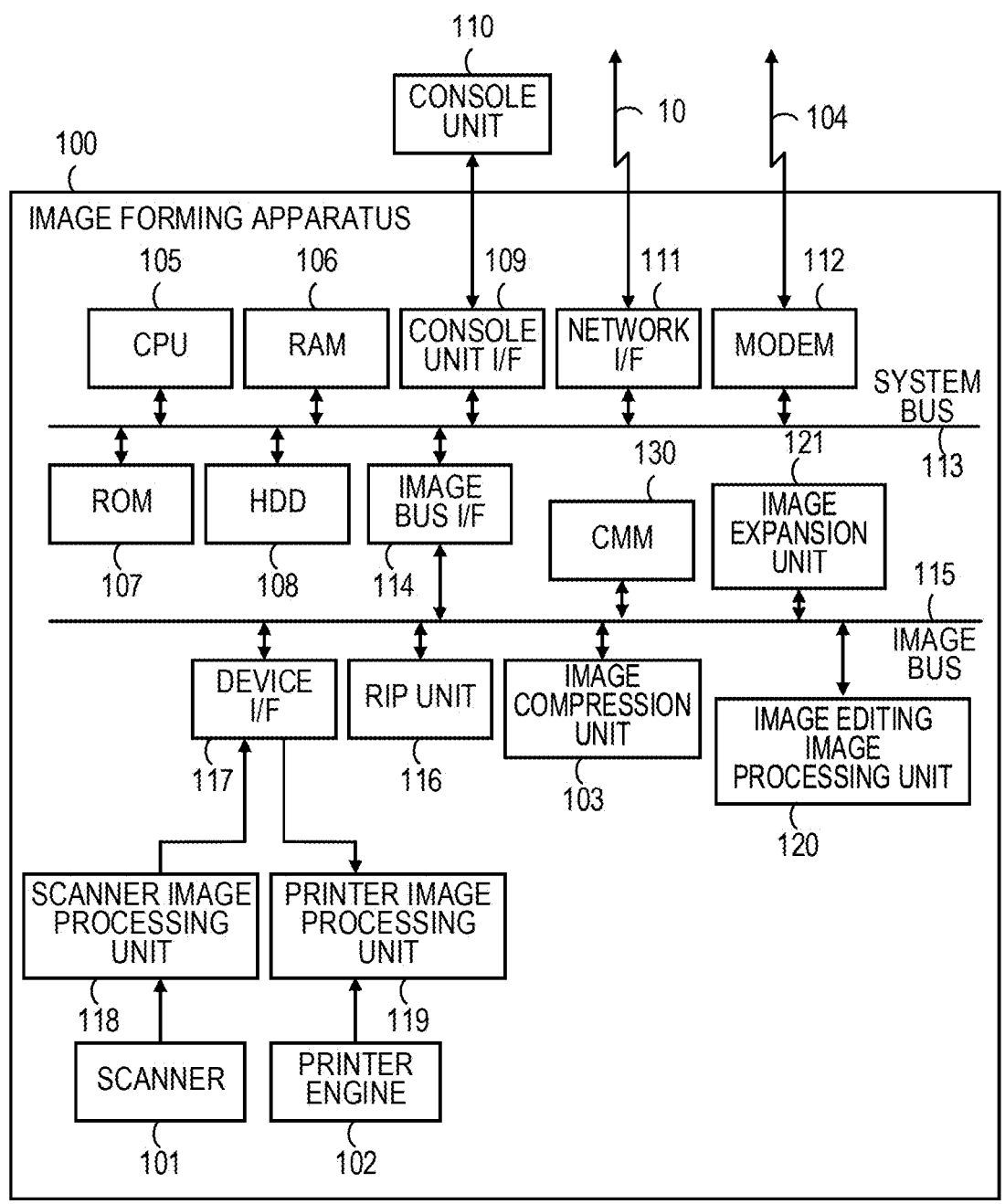
FIG. 1 is a block diagram showing an example of a configuration of an image forming apparatus according to the present embodiment.

FIG. 1 is a block diagram showing an example of a configuration of an image forming apparatus 100 according to the present embodiment. As shown in FIG. 1, in the image forming apparatus 100, a scanner 101 as an image input device and a printer engine 102 as an image output device are electrically connected inside the image forming apparatus 100.

The scanner 101 is connected to a device I/F 117 via a scanner image processing unit 118. The printer engine 102 is connected to the device I/F 117 via a printer image processing unit 119. The scanner image processing unit 118 performs control for reading image data. The printer image processing unit 119 performs control for print output.

The image forming apparatus 100 is connected to a LAN 10 and a public line 104 by a network I/F 111 and a modem 112, which will be described later. The image forming apparatus 100 performs control for inputting and outputting image information and device information via the LAN 10 and the public line 104.

A CPU 105 is a central processing unit configured to control the image forming apparatus 100. A RAM 106 is a system work memory for operating the CPU 105 and an image memory for temporarily storing input image data. A ROM 107 is a boot ROM and stores a boot program of the system.

An HDD 108 is a hard disk drive, and stores system software for various processes and input image data. It should be noted that another storage device such as a solid-state drive (SSD) may be provided instead of or in combination with the hard disk drive.

A console unit I/F 109 is an interface to a console unit 110 having a display screen capable of displaying image data, and outputs operation screen data to the console unit 110. The console unit I/F 109 also serves to transmit information input from the console unit 110 by an operator to the CPU 105.

The network I/F 111 is realized, for example, by a LAN card or the like, and is connected to the LAN 10 to input and output information to and from an external device (not shown). The modem 112 is connected to the public line 104 and inputs and outputs information to and from an external device (not shown). The above units are arranged on a system bus 113.

An image bus I/F 114 is an interface configured to connect the system bus 113 and an image bus 115 configured to transfer image data at high speed, and is a bus bridge configured to convert a data structure. A raster image processor (RIP) unit 116, the device I/F 117, an image processing unit 120, an image compression unit 103, an image expansion unit 121, and a color management module (CMM) 130 are connected to the image bus 115.

The RIP unit 116 expands a page description language (PDL) code into image data. The device I/F 117 connects the scanner 101 and the printer engine 102 via the scanner image processing unit 118 and the printer image processing unit 119 to perform synchronous/asynchronous conversion of image data. The scanner image processing unit 118 performs various processing such as correction and editing on the image data input from the scanner 101. The printer image processing unit 119 performs image processing such as γ correction and halftone processing according to the printer engine for image data to be printed out.

The image editing image processing unit 120 performs various image processing such as rotation of image data, color processing, binary conversion, and multi-value conversion. The image compression unit 103 encodes image data processed by the RIP unit 116, the scanner image processing unit 118 and the image editing image processing unit 120 by a predetermined compression system when the image data are once stored in the HDD 108.

The image expansion unit 121 decodes and expands the compressed and encoded data in the case in which the image data compressed by the HDD 108 are processed by the image editing image processing unit 120 as required and in the case in which the image data are subjected to image processing by the printer image processing unit 119 and outputted by the printer engine 102.

The CMM 130 is a dedicated hardware module that performs color conversion processing (also referred to as color space conversion processing) on image data based on profile and calibration data. Here, the profile is information such as a function for converting color image data expressed in a color space dependent on the device into color image data expressed in a color space (for example, Lab color space) independent of the device. The calibration data is data for correcting the color reproduction characteristics of the scanner 101 and the printer engine 102.

[Software Configuration]

Figure 2:
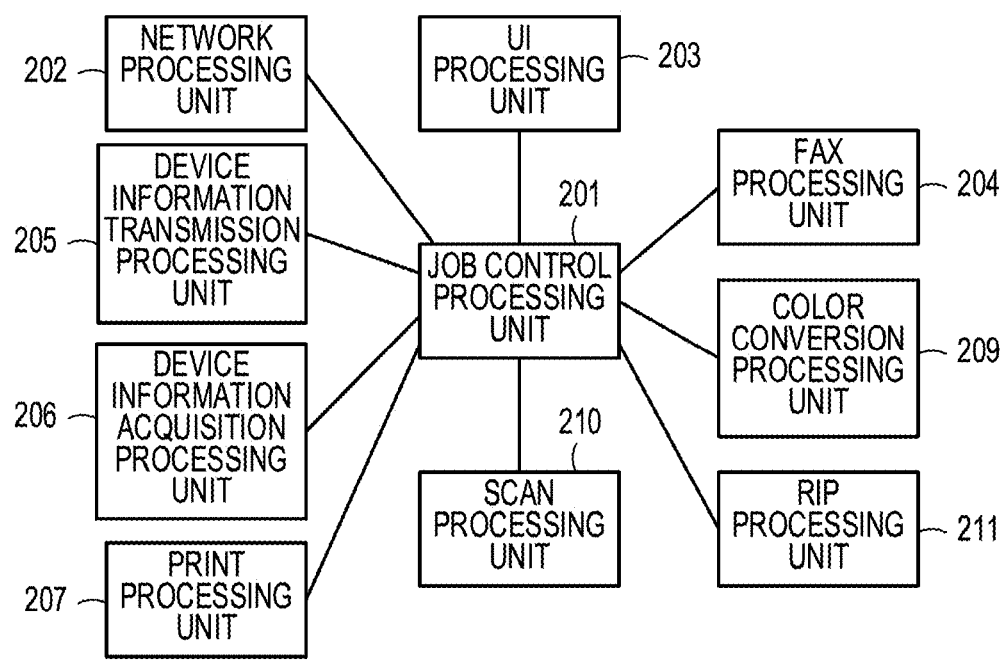
FIG. 2 is a view showing an example of a software configuration of the image forming apparatus.

FIG. 2 is a view showing an example of the software configuration of the image forming apparatus 100. The software modules shown in FIG. 2 function when the CPU 105 loads a program stored in the ROM 107 or the HDD 108 into the RAM 106 and executes the program as necessary.

A job control processing unit 201 controls each software module to control all the jobs generated in the image forming apparatus 100, such as copying, printing, scanning, and FAX transmission and reception.

A network processing unit 202 is a module configured to control communication with the outside mainly performed via the network I/F 111, and controls communication with each device on the LAN 10. A UI processing unit 203 mainly controls the console unit 110 and the console unit I/F 109. A FAX processing unit 204 controls the FAX function. The FAX processing unit 204 performs FAX reception/transmission via the modem 112.

A device information transmission processing unit 205 is a software module configured to transmit device information to a predetermined external device by the network processing unit 202 based on an instruction from the job control processing unit 201. The device information includes information representing the capability and characteristics of the image forming apparatus 100, such as the type (color/monochrome) of the printer engine 102, the resolution of the printer engine 102, the printing speed of the printer engine 102, the processing time by a color conversion processing unit 209, and the output profile. A device information acquisition processing unit 206 is a software module configured to transmit a device information acquisition request to the predetermined external device by the network processing unit 202 based on an instruction from the job control processing unit 201.

A print processing unit 207 controls the image editing image processing unit 120, the printer image processing unit 119 and the printer engine 102 based on an instruction of the job control processing unit 201 to perform printing processing of a designated image. The print processing unit 207 receives information of image data, image information (size, color mode, resolution, etc., of the image data), layout information (offset, scaling, imposition, etc.), and output paper information (size, printing orientation, etc.) from the job control processing unit 201. The print processing unit 207 controls the image compression unit 103, the image expansion unit 121, the image editing image processing unit 120, and the printer image processing unit 119 to perform appropriate image processing on the image data. Further, the print processing unit 207 controls the printer engine 102 to print the image data on the designated paper.

A scan processing unit 210 controls the scanner 101 and the scanner image processing unit 118 based on an instruction from the job control processing unit 201 to read an original on the scanner 101. The scan processing unit 210 scans an original on an original platen of the scanner 101 and inputs an image as digital data. The color information of the input image is notified to the job control processing unit 201. Further, the scan processing unit 210 controls the scanner image processing unit 118 to perform appropriate image processing, such as image compression, on the input image, and then notifies the job control processing unit 201 of the image processed input image.

The color conversion processing unit 209 performs color conversion processing on an instruction image based on an instruction of the job control processing unit 201, and notifies the job control processing unit 201 of the image after the color conversion processing.

An RIP processing unit 211 performs PDL interpretation based on an instruction of the job control processing unit 201, and performs rendering by controlling the RIP unit 116 to perform development to a bit map image.

[Image Data Processing Flow]

With the above configuration, the image processing system of the embodiment receives a print job from the LAN 10 and performs a print operation. First, as described above, the PDL data transmitted from the external device via the LAN 10 is received by the network I/F 111 and input from the image bus I/F 114 to the RIP unit 116. The RIP unit 116 interprets the received PDL data and converts the PDL data into code data that can be processed by the RIP unit 116. Further, the RIP unit 116 executes rendering based on the converted code data. The page data rendered by the RIP unit 116 are compressed by the image compression unit 103 of the subsequent stage and sequentially stored in the HDD 108.

The compressed data stored in the HDD 108 is read out in the printing operation according to the instruction from the job control processing unit 201, and the image expansion unit 121 performs an expansion processing of the compressed data. The image data expanded by the image expansion unit 121 is input to the printer image processing unit 119 via the device I/F 117.

[Printer Image Processing Unit]

Figure 3:
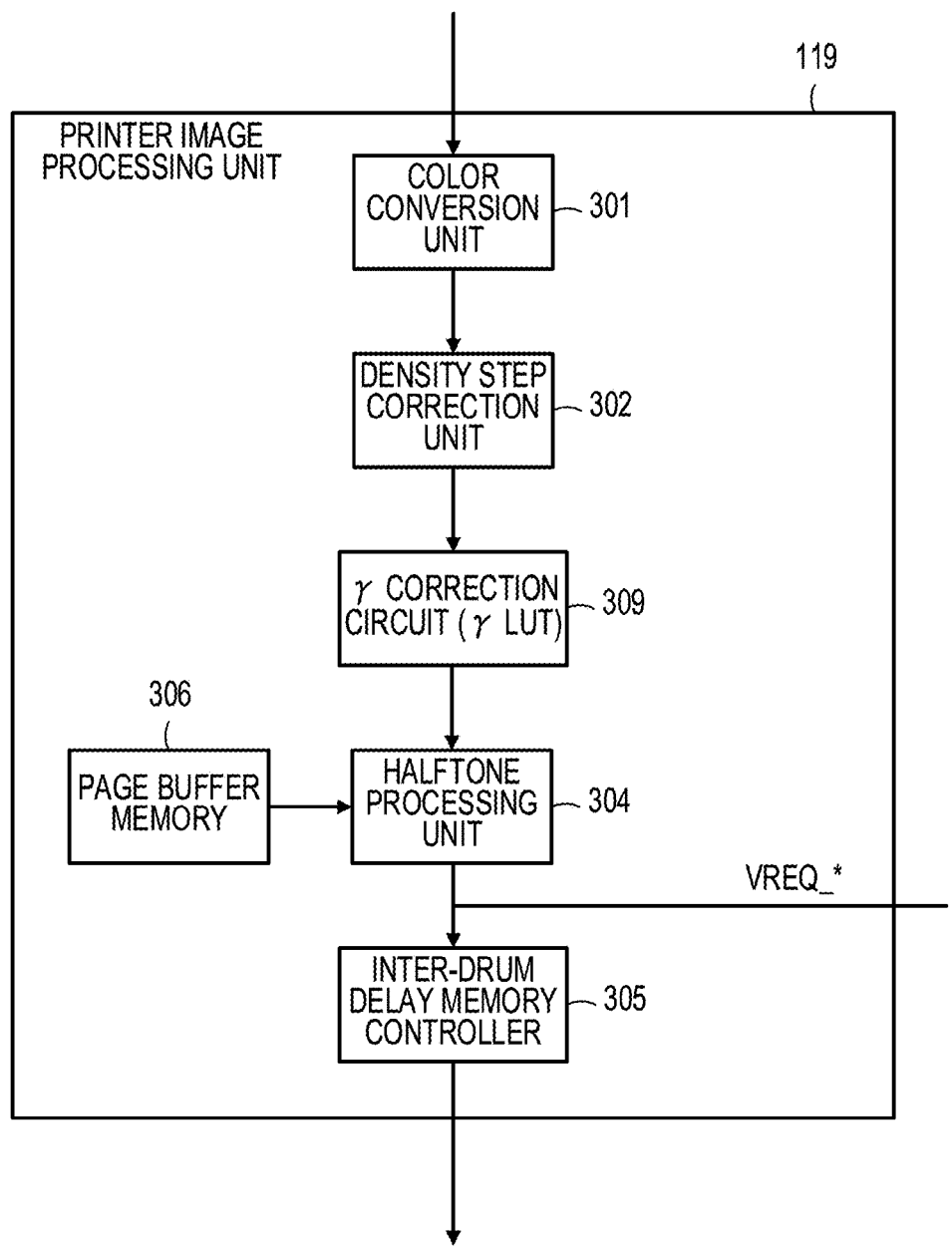
FIG. 3 is a view showing an example of a configuration of a printer image processing unit.

Next, the processing flow of the image data input to the printer image processing unit 119 will be described based on the above configuration. FIG. 3 is a view showing an example of the configuration of the printer image processing unit 119. The printer image processing unit 119 includes a color conversion unit 301, a density step correction unit 302, a γ correction circuit 309, a halftone processing unit 304, a page buffer memory 306, and an inter-drum delay memory controller 305.

The color conversion unit 301 converts the image data from a luminance value (RGB, YUV, etc.) to a density value (CMYK or the like), and converts the input image data into a color space corresponding to a color component which can be printed by the printer engine 102 of the subsequent stage.

The density step correction unit 302 converts multi-value image data converted into the density value by the color conversion unit 301 into a signal value corrected for a density step in the same page. The density step correction unit 302 has a one-dimensional table for changing the same input/output signal as the γ correction circuit 309 of the subsequent stage, and performs a step correction (density level difference correction) by multiplying the density value by a step correction coefficient according to the position in the page based on the one-dimensional table.

The γ correction circuit 309 (hereinafter referred to as "γ LUT 309") converts the density signal of the image data of which the density step has been corrected by the density step correction unit 302 into a signal value for reproducing the density by the printer engine 102. The γ LUT 309 is a table for converting input/output signals generated in accordance with the γ characteristics of the printer engine 102. In the embodiment, the γ correction is performed based on the γ LUT 309 stored in advance. However, the γ LUT 309 may be created using the known gradation control or the like, and the γ correction may be performed based on the created γ LUT 309.

The halftone processing unit 304 performs the halftone processing on the image data corrected by the γ LUT 309, and converts the image data into image data in which each color component of one pixel is represented by two values (1 bit). The halftone processing generally includes a dither method and an error diffusion method. In the present embodiment, the halftone processing may be either method. The halftone processing is not limited to the above-described method, but other methods may be used.

The binary image data generated by the conversion processing in the halftone processing unit 304 is separated for each color component of each pixel in the image data through the inter-drum delay memory controller 305 and temporarily stored in the page buffer memory 306. The inter-drum delay memory controller 305 reads data of a corresponding color component at timing when a video data request signal (VREQ_* (* is any one of Y/M/C/K)) corresponding to each color component transmitted from the printer engine 102 is inputted. The video data request signal is VREQ_Y, VREQ_M, VREQ_C, and VREQ_K for each color component. In this case, the timings of exposing photosensitive drums 1401, 1402, 1403, and 1404 corresponding to the respective color components are different depending on distances from the upstream to the downstream of the photosensitive drums 1401, 1402, 1403, and 1404 arranged in the printer engine 102, so that the timings of reading out the data of the respective color components are also different. The read color component data are output to the printer engine 102.

[Printer Engine Operation]

Figure 4:
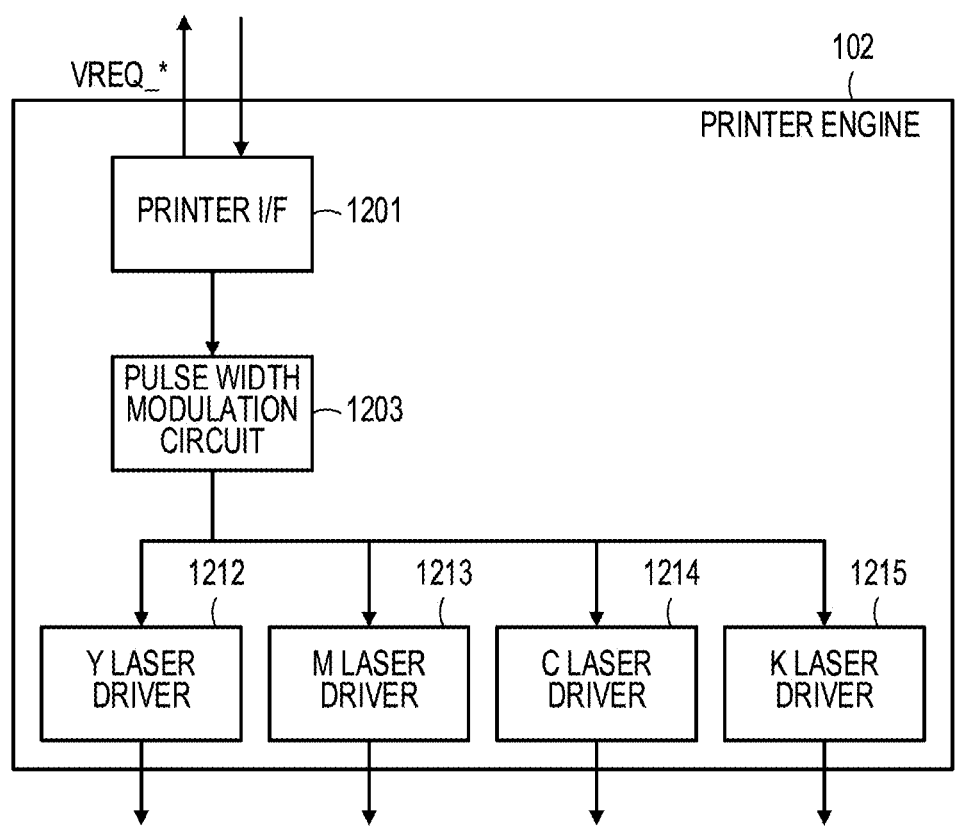
FIG. 4 is a view showing a portion of an internal configuration of a printer engine.

Next, the operation when the color component data output from the printer image processing unit 119 is input to the printer engine 102 will be described. FIG. 4 is a view showing a portion of an internal configuration of the printer engine 102. A printer I/F 1201 issues VREQ_* (* is one of Y/M/C/K) which is a video data request signal for requesting data of each color component in the case in which the printer engine 102 is ready for printing operation. The printer I/F 1201 receives the color component data sequentially transmitted from the printer image processing unit 119. The color component data received by the printer I/F 1201 is input to a pulse width modulation circuit 1203.

The pulse width modulation circuit 1203 generates pulse signals (drive signals) for driving a Y laser driver 1212, an M laser driver 1213, a C laser driver 1214, and a K laser driver 1215 of the subsequent stage based on the input actual color component data, and transmits the pulse signals to the respective laser drivers 1212, 1213, 1214, and 1215. The laser drivers 1212, 1213, 1214, and 1215 corresponding to the respective color components drive the laser exposure devices corresponding to the respective color components based on the pulse signals received from the pulse width modulation circuit 1203.

Figure 5:
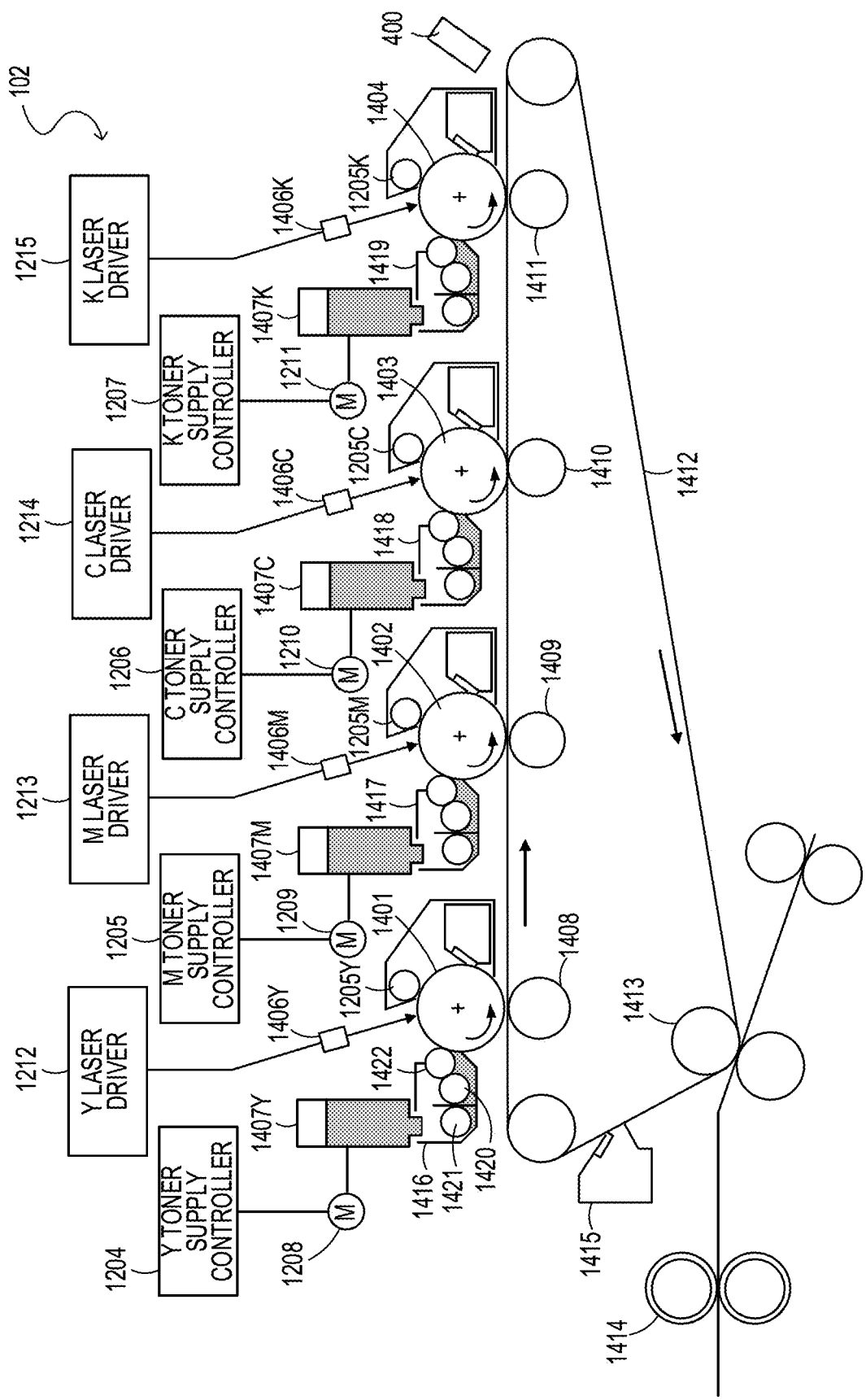
FIG. 5 is a cross-sectional view of an example of an image forming portion of the printer engine.

FIG. 5 is a cross-sectional view showing an example of an image forming portion of the printer engine 102. The printer engine 102 is a so-called electrophotographic printer engine. The printer engine 102 comprises the photosensitive drums (photosensitive members) 1401, 1402, 1403, and 1404, charging rollers (chargers) 1205Y, 1205M, 1205C, and 1205K configured to charge the surfaces of the photosensitive drums 1401, 1402, 1403, and 1404, a Y laser exposure device 1406Y, an M laser exposure device 1406M, a C laser exposure device 1406C, and a K laser exposure device 1406K configured to expose the charged surfaces of the photosensitive drums 1401, 1402, 1403, and 1404, developing devices 1416, 1417, 1418, and 1419 configured to develop electrostatic latent images formed on the surfaces of the photosensitive drums 1401, 1402, 1403, and 1404 by exposure with toner, and primary transfer devices 1408, 1409, 1410, and 1411 configured to transfer the developed toner images onto an intermediate transfer belt (image bearing member) 1412. Toner supply containers 1407Y, 1407M, 1407C, and 1407K containing toners of respective colors are driven by motors 1208, 1209, 1210, and 1211 controlled by a Y toner supply controller 1204, an M toner supply controller 1205, a C toner supply controller 1206, and a K toner supply controller 1207 to supply toners of respective colors to the developing devices 1416, 1417, 1418, and 1419. The printer engine 102 of the present embodiment includes toners of a plurality of color components (for example, yellow (Y), magenta (M), cyan (C), and black (K)), and can form toner images having the plurality of color components on the intermediate transfer belt 1412. Hereinafter, the image forming portion of yellow (Y) will be mainly described, but the image forming portions of the other color components, i.e., magenta (M), cyan (C) and black (K), have the same configuration. In the present embodiment, the printer engine 102 is an image forming apparatus using a four-color tandem engine of YMCK, but the present invention is not limited thereto.

The printer engine 102 includes the photosensitive drum 1401 having a diameter of, for example, 32 mm, the charging roller 1205Y having a diameter of, for example, 10 mm, the Y laser exposure device 1406Y, the developing device 1416, and the primary transfer device 1408 as the image forming portion of yellow (Y). The printer engine 102 includes a secondary transfer device 1413, a fixing device 1414, a cleaning device 1415, and an image density sensor 400.

The Y laser exposure device 1406Y is driven by the Y laser driver 1212, and irradiates the photosensitive drum 1401 with laser light (exposure light) to form an electrostatic latent image on the photosensitive drum 1401. The developing device 1416 develops the electrostatic latent image on the photosensitive drum 1401 with toner. The primary transfer device 1408 transfers the visualized toner image onto the intermediate transfer belt (intermediate transfer member) 1412 (primary transfer). The secondary transfer device 1413 transfers the toner image formed on the intermediate transfer belt 1412 to a sheet (recording medium) serving as an image bearing member (secondary transfer).

The fixing device 1414 fixes the toner image transferred onto the sheet. The cleaning device 1415 removes the transfer residual toner remaining on the intermediate transfer belt 1412 after the secondary transfer. The image density sensor 400 measures the density of a patch image formed on the intermediate transfer belt 1412.

The developing device 1416 is provided with a developer container which contains a developer in which toner particles (toner) and magnetic carrier particles (carrier) are mixed as a two-component developer. A first screw 1420 mixes the toner particles with the magnetic carrier particles.

A second screw 1421 conveys the toner particles. A developing sleeve 1422 having a diameter of, for example, 13 mm is disposed close to the photosensitive drum 1401, rotates in association with the rotation of the photosensitive drum 1401, and carries the developer in which the toner and the carrier are mixed. The developer carried on the developing sleeve 1422 comes into contact with the photosensitive drum 1401, and the electrostatic latent image on the photosensitive drum 1401 is developed.

Although the printer engine 102 has a conveying unit (not shown) configured to convey the printed sheet in addition to the configuration shown in FIG. 5, the description thereof is omitted in the embodiment.

In the above-described configuration of the printer engine 102, in a case in which yellow is printed, the photosensitive drum 1401 is exposed by the Y laser exposure device 1406Y driven by the Y laser driver 1212 to form an electrostatic latent image on the photosensitive drum 1401. The formed electrostatic latent image is visualized as a toner image by yellow toner carried on the developing sleeve 1422 in the developing device 1416, and the visualized toner image is transferred onto the intermediate transfer belt 1412 by the primary transfer device 1408.

In this way, the respective color components of magenta, cyan and black are similarly developed by the respective developing devices 1417, 1418 and 1419, and are visualized as toner images on the photosensitive drums 1402, 1403 and 1404, respectively. The visualized toner images are sequentially transferred by the primary transfer devices 1409, 1410 and 1411 in synchronization with the toner images of the color components transferred immediately before, and an eventual toner image formed of the toner images of 4 colors is formed on the intermediate transfer belt 1412. The toner image formed on the intermediate transfer belt 1412 is transferred to a sheet by the secondary transfer device 1413. The fixing device 1414 fixes the toner image to the sheet.

[Main Scan Shading]

Figure 6:
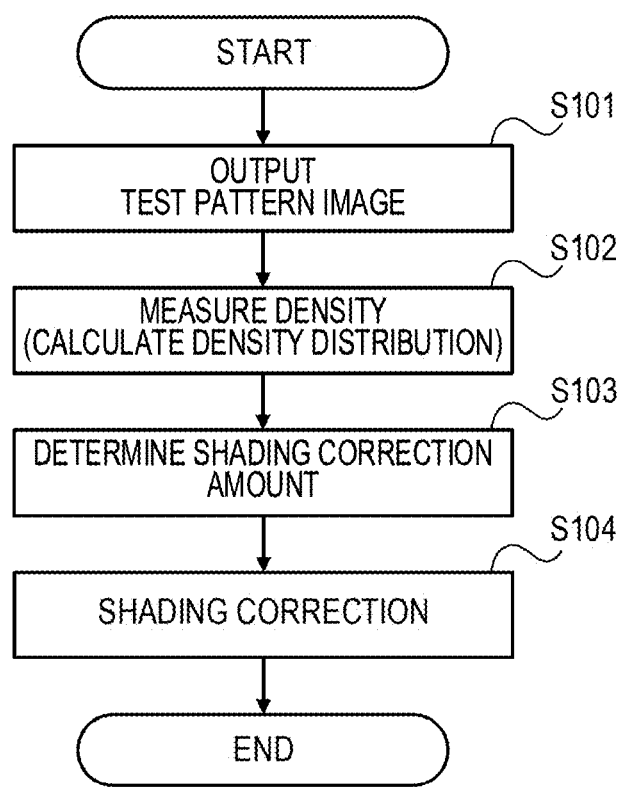
FIG. 6 is a flowchart showing an example of a main scanning shading process.

Next, density unevenness correction in the main scanning direction (hereinafter referred to as "main scanning shading") will be described. FIG. 6 is a flowchart showing an example of the main scanning shading process. The processing of the flowchart is realized by the CPU 105 loading and executing a program stored in the ROM 107 or the HDD 108 in the RAM 106 as necessary. For example, the processing may be executed by the job control processing unit 201 or by another software module (not shown).

First, when the main scanning shading process is started, the CPU 105 controls the print processing unit 207 to output a test pattern image for correcting the density in the main scanning direction (S101). The details of the test pattern image in the embodiment will be described later.

The CPU 105 instructs a user through the display screen of the console unit 110, and the user performs an operation for reading a sheet on which the test pattern image is formed by using the scanner 101. In response to the operation, the scanner 101 reads the sheet and outputs read data relating to the test pattern image to the CPU 105. The CPU 105 acquires the read data relating to the test pattern image and measures a density of the test pattern image based on the read data (S102). Next, the CPU 105 calculates a density distribution in the main scanning direction from the density measured in S102, and determines a shading correction amount so as to eliminate density unevenness (S103). The method of determining the density unevenness correction amount will be described later in detail.

Next, the CPU 105 controls so that the shading correction amount for each color component determined in S103 is transmitted to the printer engine 102 via the printer image processing unit 119 and set (S104). As a shading correction method, a method of changing a degree of modulation of pulse width modulation (PWM) of a laser beam according to a scanning position and a method of changing a degree of modulation of an intensity of the laser beam according to the scanning position are known, but they are not limited to these two methods. For example, in the case of the method of changing the degree of modulation of the pulse width modulation of the laser beam according to the scanning position, the shading correction amount for each color component determined in S103 is transmitted to the pulse width modulation circuit 1203 and stored in a memory (not shown) in the pulse width modulation circuit 1203. Thus, the pulse width modulation circuit 1203 changes the degree of modulation of the pulse width modulation of the laser beam according to the scanning position based on the shading correction amount for each color component at the time of printing. As a result, the density unevenness in the main scanning direction is corrected.

[Test Pattern]

Figure 7:
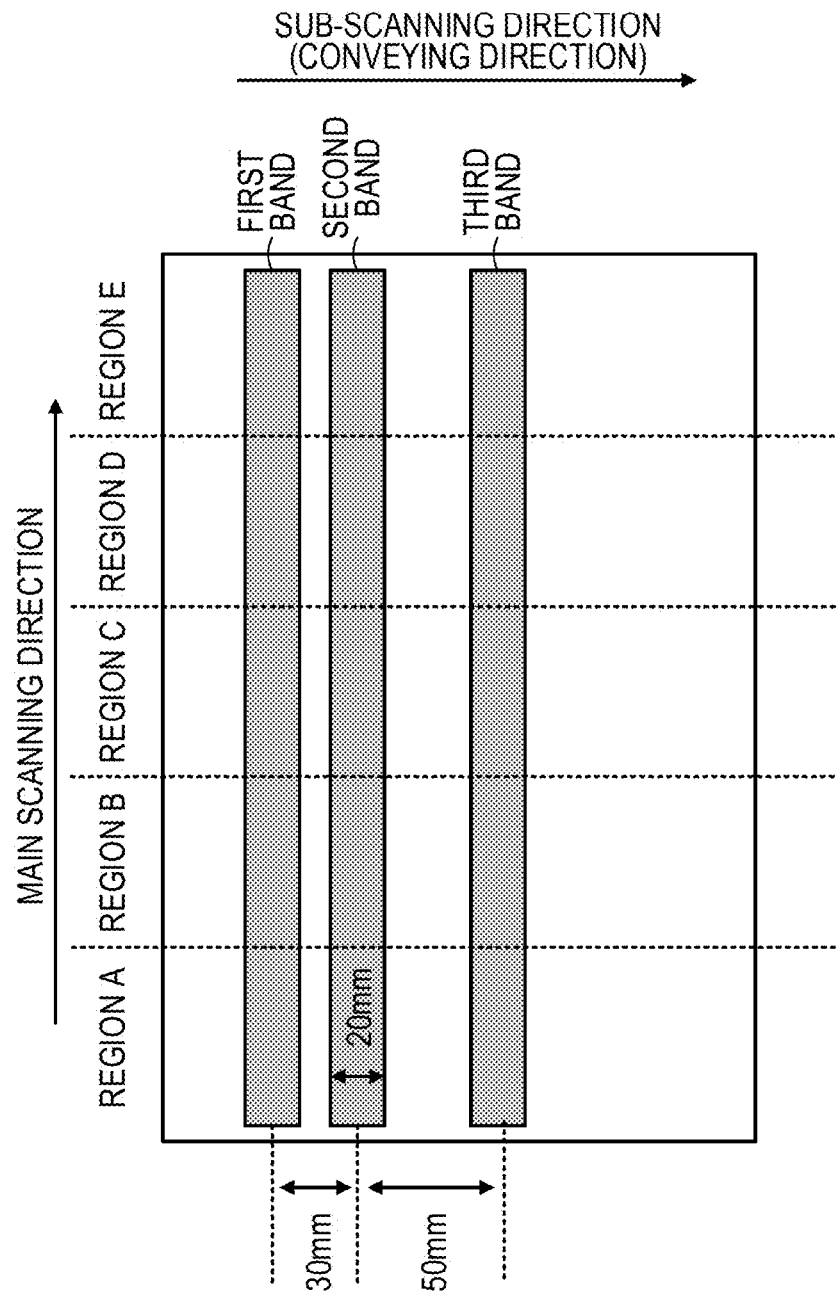
FIG. 7 is a view showing an example of a test pattern for correction in main scanning shading according to a first embodiment.

Next, the test pattern for correction in main scanning shading will be described with reference to FIG. 7. FIG. 7 is a view showing an example of the test pattern for correction in the main scanning shading according to the first embodiment. Although the cyan test pattern is described here as an example, the same technical effect can be obtained for other color components by using the same test pattern.

In the first embodiment, the test pattern is formed on a sheet of A4 size (210 mm×297 mm). The main scanning direction and the sub-scanning direction (conveying direction (moving direction) of the intermediate transfer belt 1412) at the time of forming the test pattern are as shown by arrows in FIG. 5. The main scanning direction and the sub-scanning direction are orthogonal to each other. The size of the sheet on which the test pattern is formed is not limited to the A4 size. The image forming apparatus 100 according to the first embodiment forms the test pattern on the sheet, and makes the scanner 101 read the test pattern on the sheet. Thus, information on the density of the test pattern is acquired. However, a test pattern may be formed on a sheet, and an image density of the test pattern on the sheet may be measured, for example, by an external colorimeter.

As shown in FIG. 7, the test pattern of the first embodiment includes a plurality of band images (patterns) extending along the main scanning direction. In order to exhibit the technical effect of the first embodiment, it is necessary that there are a plurality of kinds of intervals between the band images (intervals between adjacent band images in the sub-scanning direction). In the test pattern of the first embodiment, the number of band images is three. However, the number of band images formed on one sheet is not limited to the number of the first embodiment.

FIG. 7 shows, as an example, the test pattern in which the three band images are arranged, the interval between the first band and the second band (the interval between the band image center positions) is 30 mm, and the interval between the second band and the third band is 50 mm in order to detect density unevenness from the densities of a plurality of regions (density measuring points) of the test pattern in the main scanning direction. In the test pattern of the first embodiment, for example, the densities of five regions of a region A, a region B, a region C, a region D, and a region E are obtained in the main scanning direction. The CPU 105 acquires the density of each region from the read data of the scanner 101. The number of regions divided in the main scanning direction is not limited to this. The size of the band image is 20 mm×280 mm, but the size of the band image is not limited thereto.

The reason why a plurality of kinds of intervals of the band images are required is that, as described above, density unevenness having a period in the sub-scanning direction tends to occur in the image forming apparatus 100 using the electrophotographic method. An example will be described below with reference to FIG. 19.

Figure 19:
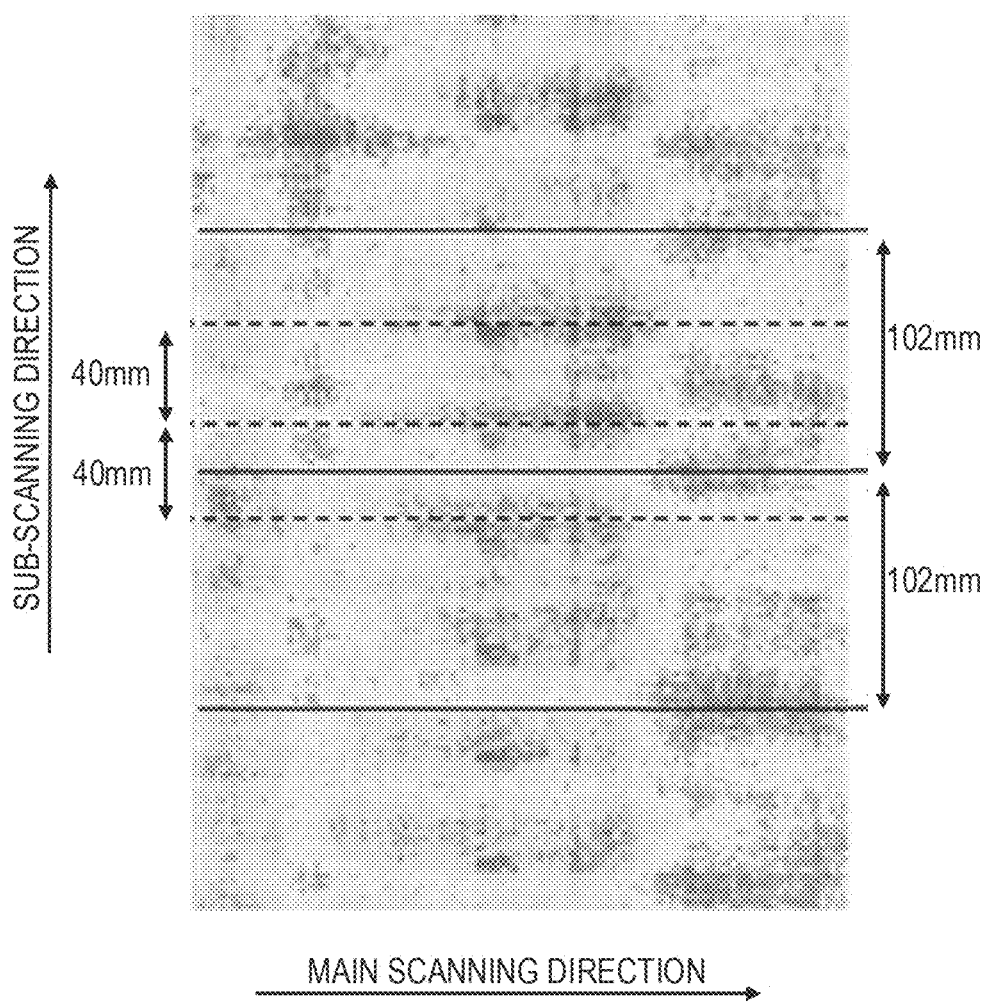
FIG. 19 is a view showing an example of an output image in which periodic density unevenness occurs in the sub-scanning direction.

FIG. 19 is a view in which an output image printed on a certain sheet of an A3 size is taken in by the scanner 101 and density unevenness is expressed in light and dark. Special image processing is performed to clarify the density unevenness. FIG. 19 shows the image as an example of the output image in which the density fluctuates periodically in the sub-scanning direction and the density unevenness occurs in the main scanning direction.

The periodic density unevenness occurring in the output image occurs particularly at periods corresponding to the circumferential lengths of the photosensitive drum 1403, the developing sleeve 1422, and the charging roller 1205C. For example, the image of FIG. 19 is an image in which unevenness in a period of about 40 mm and unevenness in a period of about 102 mm are mixed. In the image forming apparatus 100 of the first embodiment, the developing sleeve 1422 has the diameter of 13 mm, and the photosensitive drum 1403 has the diameter of 32 mm. Therefore, the circumferential length of the developing sleeve 1422 is about 41 mm (≈13 mm×π), and the circumferential length of the photosensitive drum 1403 is about 101 mm (≈32 mm×π), which are values close to the above-described unevenness periods of about 40 mm and about 102 mm (substantially coincident). Therefore, it is considered that the developing sleeve (rotary member) 1422 causes unevenness of a period of about 40 mm, and the photosensitive drum (rotary member) 1403 causes unevenness of a period of about 102 mm.

Hereinafter, a test pattern necessary for performing shading correction to reduce density unevenness in the main scanning direction on an image having such periodic unevenness will be considered.

First, consider the case of a correction test pattern having one band image in one color as a pattern 1. The density to be measured is different when a band image is formed at a place where density unevenness in the main scanning direction is strongly generated (for example, solid line portions and dotted line portions in FIG. 19) and when a band image is formed at a place where density unevenness in the main scanning direction is not strongly generated. Therefore, the shading correction amount varies depending on the place where the band image is formed. When the band image is formed at the place where density unevenness is strongly generated, a shading correction amount is determined so as to correct the density unevenness. Therefore, the deviation amount of the density is suppressed at the place where the deviation amount of the density is originally large, but a large deviation of the density occurs at the place where the deviation amount of the density is originally small due to the excessive correction amount.

Next, as a pattern 2, a case where two or more band images are provided in one color at equal intervals is considered (including two band images). In this case, when the density is abruptly inclined in a certain portion, the correction amount may be averaged or, depending on the processing method, the correction amount may be optimized by processing such as removing an unexpected portion. On the other hand, for the periodic density unevenness in the sub-scanning direction, the correction amount is significantly different between the case where the interval of the band images substantially coincides with the period (or an integral multiple of the period) and the case where the interval of the band images does not substantially coincide with the period, and the pattern 2 has the same tendency as the pattern 1.

Finally, a pattern 3, a correction test pattern having three or more band images in one color and a plurality of kinds of band image intervals as in the first embodiment is considered. In this case, since the intervals between the band images are changed, all the band images do not substantially coincide with the periodic density unevenness in the sub-scanning direction like the pattern 1 or the pattern 2. The test pattern of the first embodiment has a plurality of different intervals so that the intervals between adjacent band images include intervals that do not correspond to integral multiples of the circumferential lengths of the photosensitive drum 1403, the charging roller 1205C, and the developing sleeve 1422. Therefore, proper correction can be performed without overcorrecting the density unevenness in the main scanning direction.

As described above, the main scanning shading correction test pattern of the first embodiment has been described as the test pattern having three band images of one color and two kinds of intervals. However, the main scanning shading correction test pattern is not limited to this. The main scanning shading correction test pattern may have a greater number of band images and more kinds of intervals. The main scanning shading correction test pattern may be formed as three or more band images in one color, and the intervals of the three or more band images in the sub-scanning direction may be two or more kinds of intervals which are disjointed from each other (common number is only one). For example, the interval between the first band and the second band may be 30 mm, and the interval between the second band and the third band may be 49 mm in FIG. 7, so that the two intervals formed by the three band images have a disjointed relationship (the common number of 30 and 49 is only 1). Thus, all the band images do not substantially coincide with the periodic density unevenness in the sub-scanning direction.

[Method for Determining Shading Correction Amount]

Next, a shading correction amount determination method in the step S103 of FIG. 6 will be described. That is, the density unevenness correction method in the main scanning direction of the image forming apparatus 100 will be described. As the correction method, the method of changing the degree of modulation of the PWM modulation of the laser beam according to the scanning position and the method of changing the degree of modulation of the intensity of the laser beam according to the scanning position are known, but the correction method is not limited to these two methods.

Figures 8, 9, 10:
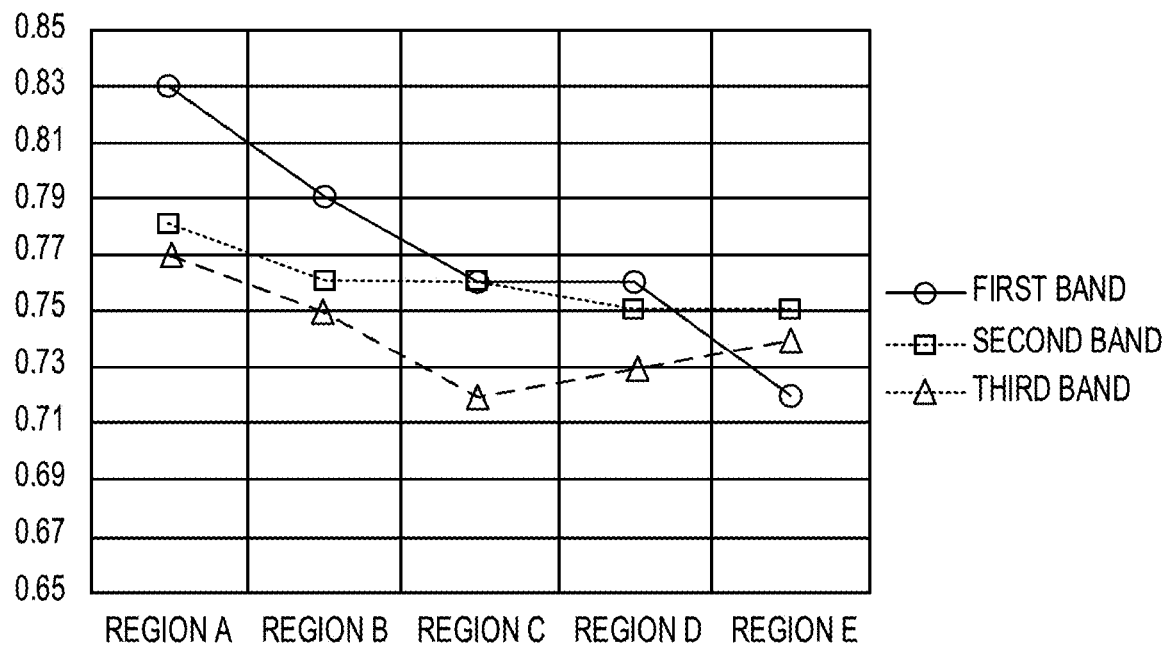
FIG. 8 is a graph showing a density measurement result before density unevenness correction in the first embodiment.
FIG. 9 is a view showing a density measurement result before the density unevenness correction in the first embodiment.
FIG. 10 is a view showing a density difference result before the density unevenness correction in the first embodiment.

In the main scanning shading correction chart output in the step S101 of FIG. 6, the regions are divided in the main scanning direction as shown in FIG. 7, and density measurement is performed for each band in each region. Examples of measurement results are shown in FIG. 8 and FIG. 9. FIG. 8 is a graph showing an example of the result of measuring the density of the test pattern in the step S102. FIG. 9 is a view showing an example of the result of measuring the density of the test pattern in the step S102.

Next, the average density of each band is calculated, and a density difference ΔDens of each region with respect to the average density is calculated. An example of the calculation result is shown in FIG. 10. FIG. 10 is a view showing an example of a density difference result before the density unevenness correction in the first embodiment.

Next, a required correction amount for the density difference result is calculated. The required correction amount is calculated by the following Expression 1.

(Required correction amount)=−(ΔDens×(correction coefficient $N$)) ... Expression 1

Figures 11, 12, 13:
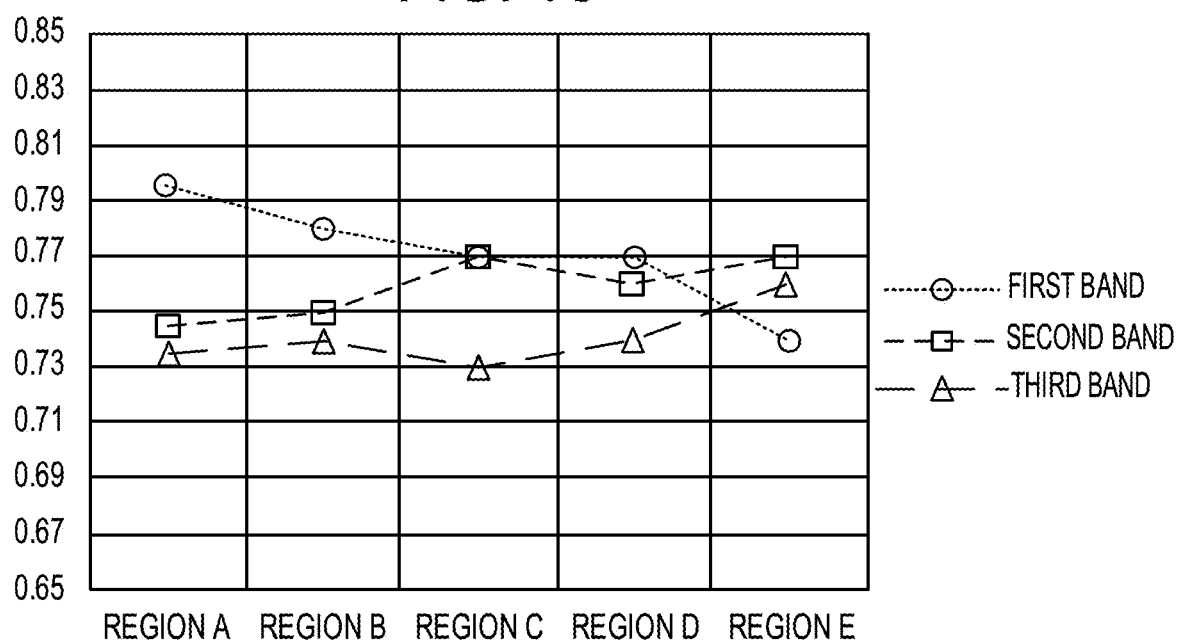
FIG. 11 is a view showing a calculation result of a required correction amount for each band region in the first embodiment.
FIG. 12 is a view showing an exposure correction level at the time of the density unevenness correction in the first embodiment.
FIG. 13 is a graph showing a density measurement result after the density unevenness correction in the first embodiment.

The correction coefficient N in Expression 1 is a coefficient for determining how much the PWM modulation of the laser beam and the level of the degree of modulation of the laser beam intensity are changed with respect to the density difference. For example, when the correction coefficient N=100, the level of the degree of modulation is changed by "1" when the density difference ΔDens is "0.01". In the first embodiment, the correction coefficient N is set to 200 (N=200). The correction coefficient N is not limited thereto. It should be noted that, in this case, a value obtained by rounding off the calculation result on the right side of Expression 1 is calculated as the required correction amount, but the first embodiment is not limited thereto. FIG. 11 is a view showing an example of the calculation result of the required correction amount for each band region in the first embodiment.

Next, the exposure correction level in each region is determined from the required correction amount in each region in each band calculated as described above. The exposure correction level is calculated as the average value of the density difference result of each band in the same region. FIG. 12 is a view showing an example of the exposure correction level at the time of the density unevenness correction in the first embodiment.

In the first embodiment, the exposure correction level is calculated as an average value for each region, but the exposure correction level is not limited to this. For example, the exposure correction level may be an intermediate value or a value obtained by other statistical processing. Thus, by calculating the degree of modulation of the exposure level necessary for correction and adjusting the exposure level, the density unevenness in the main scanning direction can be corrected.

Next, the technical effect of density unevenness correction using the main scanning shading pattern as in the first embodiment will be described. FIG. 13 and FIG. 14 show the measured density in each region in each band when the same test pattern is output again after the correction as described above. FIG. 13 is a graph showing an example of a density measurement result after the density unevenness correction in the first embodiment. FIG. 14 is a view showing an example of the density measurement result after the density unevenness correction in the first embodiment.

As shown in FIG. 8 and FIG. 9, the density measurement results before the main scanning shading correction according to the first embodiment are as follows.
Maximum density Dmax=0.83
Minimum density Dmin=0.72
Density differenceΔD=0.11
Density gradient in each band: the first band=0.11, the second band=0.03, the third band=0.05

On the other hand, as shown in FIG. 13 and FIG. 14, the density measurement results after the main scanning shading correction according to the first embodiment are as follows.
Maximum density Dmax=0.795
Minimum density Dmin=0.73
Density difference ΔD=0.065
Density gradient in each band: the first band=0.055, the second band=0.025, the third band=0.03

It can be seen that density unevenness in the main scanning direction is reduced by the main scanning shading correction of the first embodiment.

As a first comparative example, FIG. 15 shows density results after correction in the case where the intervals of the bands are formed at equal intervals and the main scanning shading is performed using the test patterns formed at the positions where the gradient of the density is large.

FIG. 15 is a view showing density measurement results (the first comparative example) after the conventional density unevenness correction. The density measurement results (the first comparative example) obtained in the case where the main scanning shading is performed using the test patterns formed at the positions where the gradient of the density is large by the conventional density unevenness correction are as follows.
Maximum density Dmax=0.8
Minimum density Dmin=0.71
Density difference ΔD=0.09
Density gradient in each band: the first band=0, the second band=0.08, the third band=0.08

From the measurement results of the first comparative example, it can be seen that, although proper correction is performed in one region, correction is excessive in another region, and as a result, the effect of correction is small.

As a second comparative example, FIG. 16 shows density results after correction in the case where the main scanning shading is performed by using the test patterns formed at positions where the density gradient is small and the intervals of bands are formed at equal intervals.

FIG. 16 is a view showing density measurement results (the second comparative example) after the conventional density unevenness correction. The density measurement results (the second comparative example) obtained in the case where the main scanning shading is performed using the test patterns formed at positions where the density gradient is small by the conventional density unevenness correction are as follows.
Maximum density Dmax=0.82
Minimum density Dmin=0.73
Density difference ΔD=0.09
Density gradient in each band: the first band=0.08, the second band=0, the third band=0.03

From the density measurement results of the second comparative example, it can be seen that, although proper correction is performed in one region, correction is insufficient in another region, and as a result, the effect of correction is small.

As described above, in the test pattern for correcting the density unevenness in the main scanning direction, the density unevenness in the main scanning direction is corrected by using the test pattern having three or more band images for density measurement in the sub-scanning direction and having two or more kinds of intervals between a band image and a band image. In this way, the test pattern is composed of three or more band images of one-color component, and the intervals of the adjacent band images include intervals which do not correspond to integral multiples of the circumferential length of the rotary member (photosensitive member, charging roller, developing sleeve) in the image forming portion. Therefore, it is possible to prevent the density unevenness periodically generated in the sub-scanning direction caused by the rotary member in the image forming portion from coinciding with all of the formation positions of the respective band images in the test pattern used for the main scanning shading. Thus, even in the case where the density unevenness occurs periodically in the sub-scanning direction, the density unevenness correction in the main scanning direction can be performed with high accuracy.

Second Embodiment

In the first embodiment, in the test pattern for correcting density unevenness in the main scanning direction, a monochromatic (one-color component) test pattern in which three or more band images for density measurement are arranged in the sub-scanning direction and kinds of intervals between the band images are two or more is used. Then, a configuration in which a shading correction amount is set using the monochromatic test pattern for a color component requiring main scanning shading is explained. In the second embodiment, a case where four colors of Y, M, C and K are used as the test pattern will be described. The image forming apparatus 100, the flowchart in the main scanning shading, and the correction method, which are described in the first embodiment, are the same in the second embodiment, and therefore, the description thereof is omitted.

[Test Pattern]

The main scanning shading correction test pattern according to the second embodiment will be described with reference to FIG. 17. FIG. 17 is a view showing an example of the test pattern for correction in the main scanning shading according to the second embodiment. Here, as an example, the test pattern in which four band images for each color are arranged in the sub-scanning direction will be described, but the test pattern is not limited thereto.

In the image forming apparatus 100 of the first embodiment, the test pattern is formed on a sheet of A4 size (210 mm×297 mm). The main scanning direction and the sub-scanning direction (conveying direction (moving direction) of the intermediate transfer belt 1412) at the time of forming the test pattern are as shown by arrows in FIG. 17. The size of the sheet forming the test pattern is not limited to the A4 size.

As shown in FIG. 17, the test pattern includes a total of 16 band images arranged from the top in the conveying direction in the order of Y→M→C→K→M→Y→K→C→M→Y→C→K→Y→M→C→K. In the test pattern, four band images for each one-color component of a plurality of color components are arranged in the sub-scanning direction, and the order of the arrangement is an arrangement order in which the intervals of band images of the same color component become a plurality of kinds.

FIG. 18 shows the intervals between the band images of respective colors. FIG. 18 is a table showing an example of the band intervals for respective colors of the test pattern for correction in the main scanning shading according to the second embodiment.

As can be seen from FIG. 18, the intervals of the band images for each color are set so that the interval of the first band to the second band, the interval of the second band to the third band, and the interval of the third band to the fourth band are different from one another. The band image is 10 mm×280 mm, but the band image is not limited thereto. In the test pattern of the second embodiment, three or more patterns for each one-color component of the plurality of color components are arranged in the sub-scanning direction, and the order of the arrangement is such that the intervals of the patterns of the same color component in the sub-scanning direction become a plurality of kinds.

As described in the first embodiment, in the image forming apparatus 100 using the electrophotographic method, density unevenness with a period in the sub-scanning direction tends to occur. Therefore, in the case in which the density unevenness in the main scanning direction is corrected by using one or two band images of each color in the sub-scanning direction, it is easy to be affected by the period in the sub-scanning direction, and even if there are three or more band images, if the interval between the band images is the same, it becomes easy to be affected by the period in the sub-scanning direction. Therefore, if the correction test pattern formed by the arrangement of the band images as shown in the second embodiment is used, even in the case in which the strong and weak in the density unevenness is periodically generated in the sub-scanning direction, the influence of the strong and weak in the density unevenness is alleviated, and the density unevenness correction can be performed properly for all colors.

In the second embodiment, the correction pattern in which the band images are arranged in the order of Y→M→C→K→M→Y→K→C→M→Y→C→K→Y→M→C→K has been described. However, the arrangement is not limited to this, and the same technical effect can be obtained if the arrangement is such that there are a plurality of kinds of intervals between band images of each color.

In the second embodiment, the correction pattern in which the band images of all colors (four colors of YMCK in this case) are arranged in an area of one sheet of A4 size has been described, but the correction pattern is not limited to this. For example, it is possible to use a test pattern formed in an area over a plurality of sheets of A4 size, and the same technical effect can be obtained if there are a plurality of kinds of intervals between band images of each color.

Further, even in the case of the two-color or three-color correction pattern, if there are a plurality of kinds of intervals between the band images of the respective colors, the same technical effect can be obtained with respect to the colors. The CPU 105 performs the main scanning shading processing shown in FIG. 6 using a correction pattern in which band images of color components for main scanning shading are arranged. For example, in the case of performing the main scanning shading of two colors Y and C, the CPU 105 performs the main scanning shading processing shown in FIG. 6 using the correction pattern in which the two colors Y and C are arranged. For an image forming apparatus configured to form an image using five or more color components, correction patterns of five or more colors may be used.

As described above, according to the embodiments, even in the case in which the density unevenness is periodically generated in the sub-scanning direction, the density unevenness in the main scanning direction can be corrected with high accuracy.

The structure and contents of the various data described above are not limited to this, and it goes without saying that the structure and contents of the various data may vary depending on the use and purpose. Although the first and second embodiments have been described above, the present invention can be implemented as, for example, a system, an apparatus, a method, a program or a storage medium. More specifically, the present invention may be applied to a system comprising a plurality of devices, or may be applied to a single device. In addition, the combination of the above embodiments is also included in the present invention.

(Other Embodiments)

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-158690, filed Sep. 23, 2020, which is hereby incorporated by reference herein in its entirety.

What is claimed is:

1. An image forming apparatus, comprising:
an image forming unit configured to form an image, the image forming unit including:
a photosensitive member that is rotated;
an exposure unit configured to expose the photosensitive member to form an electrostatic latent image on the photosensitive member; and
a developing unit having a developing sleeve carrying toner and rotating, and configured to develop the electrostatic latent image on the photosensitive member with the toner on the developing sleeve; and
a controller configured to:
control the image forming unit to form a first test image, a second test image, and a third test image used for adjusting a density in a main scanning direction of an image having a predetermined color to be formed by the image forming unit at different positions in a direction orthogonal to the main scanning direction on a same sheet;
acquire read data relating to the first test image, the second test image, and the third test image on the same sheet, the read data being output from a reading device; and
adjust the density in the main scanning direction of an image having the predetermined color to be formed by the image forming unit based on the read data,
wherein a first interval between the first test image and the second test image in the direction orthogonal to the main scanning direction is different from a second interval between the second test image and the third test image in the direction orthogonal to the main scanning direction,
wherein each of the first interval and the second interval is different from an integral multiple of a circumferential length of the photosensitive member, and
wherein each of the first interval and the second interval is different from an integral multiple of a circumferential length of the developing sleeve.

2. The image forming apparatus according to claim 1, wherein the image forming unit further includes a charging roller configured to charge the photosensitive member, and
wherein each of the first interval and the second interval is different from an integral multiple of a circumferential length of the charging roller.

3. The image forming apparatus according to claim 1, wherein the controller controls the image forming unit to form fourth test images having the predetermined color in a position different from the first test image, the second test image and the third test image in the direction orthogonal to the main scanning direction on the same sheet, and
wherein in the direction orthogonal to the main scanning direction, third intervals between the third test image and the fourth test images are different from each of the first interval and the second interval.

4. The image forming apparatus according to claim 1, wherein the controller controls the image forming unit to form a fourth test image, a fifth test image, and a sixth test image used for adjusting the density in the main scanning direction of an image having another color different from the predetermined color to be formed by the image forming unit at different positions in the direction orthogonal to the main scanning direction on the same sheet,
wherein the fourth test image is formed between the first test image and the second test image in the direction orthogonal to the main scanning direction,
wherein the fifth test image is formed between the second test image and the third test image in the direction orthogonal to the main scanning direction,
wherein a third interval between the fourth test image and the fifth test image in the direction orthogonal to the main scanning direction is different from a fourth interval between the fifth test image and the sixth test image in the direction orthogonal to the main scanning direction,
wherein each of the third interval and the fourth interval is different from the integral multiple of the circumferential length of the photosensitive member, and
wherein each of the third interval and the fourth interval is different from the integral multiple of the circumferential length of the developing sleeve.

5. The image forming apparatus according to claim 1, wherein the first interval is a distance from a center of the first test image in the direction orthogonal to the main scanning direction to a center of the second test image in the direction orthogonal to the main scanning direction, and
wherein the second interval is a distance from the center of the second test image in the direction orthogonal to the main scanning direction to a center of the third test image in the direction orthogonal to the main scanning direction.

6. The image forming apparatus according to claim 1, wherein the controller adjusts the density in the main scanning direction of an image to be formed by the image forming unit by controlling an intensity of exposure light at which the exposure unit exposes the photosensitive member based on the read data.

7. The image forming apparatus according to claim 1, wherein a longitudinal direction of each of the first test image, the second test image, and the third test image is parallel to the main scanning direction.

8. An image forming apparatus, comprising:
an image forming unit configured to form an image, the image forming unit including:
a photosensitive member that is rotated;
an exposure unit configured to expose the photosensitive member to form an electrostatic latent image on the photosensitive member; and
a developing unit having a developing sleeve carrying toner and rotating, and configured to develop the electrostatic latent image on the photosensitive member with the toner on the developing sleeve; and
a controller configured to:
control the image forming unit to form first test images of different colors, second test images of the different colors, and third test images of the different colors used for adjusting a density in a main scanning direction of the image to be formed by the image forming unit at different positions in a direction orthogonal to the main scanning direction on a same sheet, each of the first test images, the second test images, and the third test images including yellow, magenta, cyan, and black images formed at different positions in the direction orthogonal to the main scanning direction;
acquire read data relating to the first test images, the second test images, and the third test images on the same sheet, the read data being output from a reading device; and
adjust the density in the main scanning direction of an image to be formed by the image forming unit based on the read data,
wherein a color order of each of the first test images, the second test images, and the third test images is different from one another.

9. The image forming apparatus according to claim 8, wherein the controller controls the image forming unit to form fourth test images of different colors used for adjusting the density in the main scanning direction at positions different from the first test images, the second test images, and the third test images in the direction orthogonal to the main scanning direction on the same sheet, and
wherein the fourth test images include yellow, magenta, cyan, and black images formed at different positions in the direction orthogonal to the main scanning direction.

10. The image forming apparatus according to claim 8, wherein an interval between images of a same color of the first test images and the second test images is different from an integral multiple of a circumferential length of the photosensitive member, and
wherein the interval between the images of the same color of the first test images and the second test images is different from an integral multiple of a circumferential length of the developing sleeve.

11. The image forming apparatus according to claim 10, wherein the image forming unit further includes a charging roller configured to charge the photosensitive member, and
wherein the interval between the images of the same color of the first test images and the second test images is different from an integral multiple of a circumferential length of the charging roller.

12. The image forming apparatus according to claim 10, wherein the interval between the images of the same color of the first test images and the second test images is a distance between respective centers of the images of the same color in the direction orthogonal to the main scanning direction.

13. The image forming apparatus according to claim 8, wherein the controller adjusts the density in the main scanning direction of an image to be formed by the image forming unit by controlling an intensity of exposure light at which the exposure unit exposes the photosensitive member based on the read data.

* * * * *